United States Patent

[11] 3,577,746

| [72] | Inventor | Clarence F. Dolan<br>Erie, Pa. |
| [21] | Appl. No. | 795,116 |
| [22] | Filed | Jan. 29, 1969 |
| [45] | Patented | May 4, 1971 |
| [73] | Assignee | General Electric Company |

[54] SELF CONTAINED LUBRICATION SYSTEM FOR HIGH SPEED DRIVE SHAFT COUPLING
1 Claim, 3 Drawing Figs.

| [52] | U.S. Cl. | 64/23 |
| [51] | Int. Cl. | F16d 3/06 |
| [50] | Field of Search | 64/6, 9, 23 |

[56] References Cited
UNITED STATES PATENTS
3,153,921 10/1964 Shenk............................ 64/9

FOREIGN PATENTS
1,139,132 2/1957 France .................... 64/6

*Primary Examiner*—Milton Kaufman
*Attorneys*—I. David Blumenfeld, Frank L. Neuhauser and Oscar B. Waddell ABSTRACT: A self-contained lubrication system for a splined high speed drive shaft coupling. One of the splined shafts is coated with a mixture of a solid lubricant and grease. A grease reservoir is mounted on one of the shafts to replenish the lubricant required at the spline surfaces. Rotation of the shafts forces the oil in the grease from the reservoir onto the spline surfaces thereby constantly replenishing the oil content of the lubricant mixture provided at the spline surfaces.

PATENTED MAY 4 1971 3,577,746

INVENTOR.
CLARENCE F. DOLAN
BY *I David Blumenfeld*
ATTORNEYS

SELF CONTAINED LUBRICATION SYSTEM FOR HIGH SPEED DRIVE SHAFT COUPLING

This invention relates to a lubrication system for a high speed, splined drive shaft couplings and more particularly, to a self-contained lubrication system.

High speed aircraft generators, which are designed to operate at speeds from 6,000 to 12,000 r.p.m. or more, may present serious maintenance and reliability problems because of the difficulty in properly lubricating the generator and its associated elements. The most critical limitation often is not the generator itself, but in the drive shaft coupling between the generator and the primary driving source. Such drive shaft couplings often take the form of two mating splined shafts connected respectively to the generator and the driving source. At these speeds, any misalignment between the centers of rotation of the generator and the primary drive causes heavy loading of the spline surfaces which may result in severe wear. The problem is further aggravated in generators designed for aircraft use where size and weight considerations dictate that all components be made as small as possible. The surface areas of the splines are therefore, made as small as possible thereby increasing the loading. Proper lubrication of the splines is therefore, crucial since any inadequacies in the lubrication system can easily result in damage to a failure of the drive shaft coupling, disabling the entire system. Therefore, an effective, long lived, and reliable lubrication system is of paramount importance.

One approach to this problem in the past has involved the use of a pressurized system in which oil is forced into the coupling thereby assuring adequate lubrication at the spline faces. While such a system solves the reliability and long life problem, it is far from satisfactory from size and weight standpoint. A pressurized oil flow system, of course, requires a separate oil reservoir, a pump or the like for forcing the oil under pressure through the splines, and a sump or oil recirculation arrangement. Such a system obviously requires more space, is more expensive, and adds extra weight to the system. A need therefore, exists for a self-contained lubrication system which is small in size, light in weight, which has a long and reliable life without requiring disassembly of the system and replenishment of the lubricant.

It is therefore, a primary objective of this invention to provide a self-contained lubrication system for a high-speed splined coupling;

A further objective of this invention is to provide a self-contained lubrication system for a high-speed splined coupling in which the supply of lubricant to the spline faces is continuously replenished;

Another objective of the invention is to provide a self-contained lubrication system for high-speed splined coupling which is reliable in operation, has a long operating life without maintenance and overhaul, is light in weight and small is size;

Other objectives and advantages of the invention will become apparent as the description thereof proceeds.

These various objectives and advantages are realized in the instant invention by providing a high speed splined coupling in which a permanent grease reservoir is mounted at one end of a splined drive shaft. The reservoir is filled with a grease or lubricant composition and is so positioned that its axis is on the axis of rotation of the splined shaft. The centrifugal force generated by rotation of the shaft causes the lubricant in the reservoir to be centrifuged to the mating surfaces of the splines thereby replenishing the oil content of a lubricant grease mixture which is initially placed on the surfaces of the splines. The drive shafts are sealed by an O-ring to minimize escape of the lubricant thereby assuring long life and reliable operation for the system.

The novel features of the invention are set forth with particularity in the appended claims. The invention itself, however, both as to its organization and method of operation, together with further objectives, advantages thereof, may be best understood by reference to the following description taken in conjunction with the accompanying drawings when:

Figure 1:
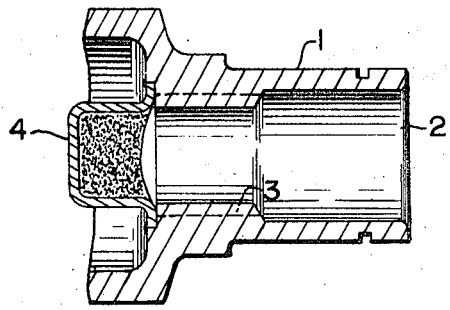
FIG. 1 is a section of view of the splined outer drive shaft.

FIG. 1 illustrates a sectional view of a portion of the splined drive outer shaft forming part of the coupling. A hollow drive shaft 1 forms one element of the coupling. A chamber 2 in the shaft contains an internally splined section 3 which mates with the externally splined drive shaft of FIG. 2. A cylindrical cup-shaped grease reservoir 4 is securely fastened inside of shaft and closes one end of chamber 2. The reservoir is mounted to be coaxial with the shaft axis to insure centrifugal dissemination of the lubricant.

Figure 2:
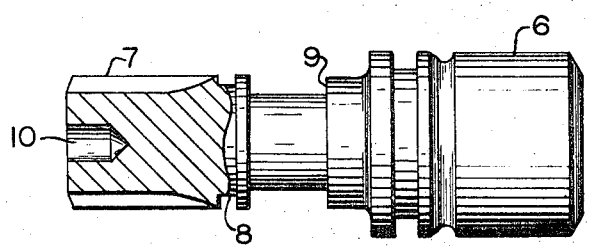
FIG. 2 is a sectional view of the splined drive shaft member which mates with shaft of FIG. 1 to form the coupling.

A mating drive shaft is illustrated in FIG. 2 and has a splined portion 7 at one end. Splined shaft 6 fits inside of shaft 1 and mates with internal splines 3 to form the coupling. A channel 8 is provided adjacent to the splined portion to receive an O-ring which seals the coupling. A shoulder 9 at the right-hand end of the shaft limits relative axial movement of shafts 1 and 6 when assembled. Shaft 6, of course, is connected at the other end either to the driving or the driven elements when the coupling is in its assembled state.

The splined surfaces of shafts 1 and 6 are covered by a mixture of a solid lubricant and grease to provide lubrication for the spline surfaces with the lubricant contained in reservoir 4 continually replenishing the grease lubricant at the surfaces of the spline. A countersunk hole or opening 10 is provided in shaft 10 to control the degree of compression of the air, and hence the positive air pressure in the coupling when in the assembled stage. That is, the size and dimension of this countersunk hole will control the amount of compression of the air in the coupling when the coupling is assembled. By varying the volume of the opening 10 the degree of compression and hence the positive air pressure may be closely controlled.

The positive air pressure in the coupling, which may be 20 p.s.i.g. or so, performs a dual function. Its primary purpose is to assure adequate sealing of the coupling by forcing the O-ring against right-hand wall of O-ring channel 8. In addition, it provides a means, presently to be described, for testing the coupling without disassembling it.

The lubricants to be utilized in the reservoir 4 and on the surface of the splined elements of the shaft should have the required viscosity, and temperature stability to provide proper lubrication at the load pressures and speeds to which the coupling is subjected. Preferably a lubricant having a low viscosity, in the order of 250 S.U.S. (Saybolt Universal Seconds) as defined in A.S.T.M. D88–56, is required. One commercially available lubricant meeting these requirements is solid grease sold under the trade designation Unitemp 500 by Texaco Oil Co. The spline faces are initially treated with a mixture of a grease and a solid lubricant. One preferred mixture is marketed under the trade designation Molykote 306X by the Dow Corning Corporation of Middleton, Michigan. Molykote 306X consists of approximately 50 percent by weight of a low viscosity, high temperature grease such as the Unitemp 500 referred to above and 50 percent of a solid lubricant such as molybdenum disulfide. While the lubricants described above are preferred in that they are found to be operative and useful, and will be appreciated that many other types solids and grease lubricants may be used as long as they satisfy the basic criteria of low viscosity and high temperature stability.

Figure 3:
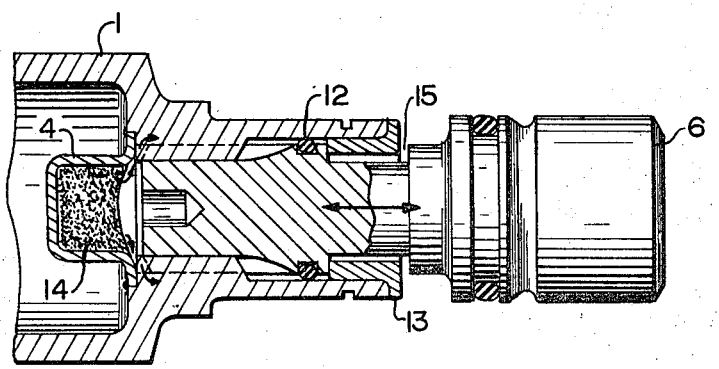
FIG. 3 is a partial sectional view of the assembled coupling and lubricant system.

FIG. 3 illustrates the novel coupling and self-contained lubrication system in the assembled state. The externally splined stub shaft 6 is positioned in the hollow shaft with the splined portions of the two shafts engaging. An O-ring 12 seated in channel 8 provides a seal between the interior wall of hollow drive shaft 1 and shaft 6. A retaining ring 13 is secured over the end of shaft 1 and extends partially into chamber 2 to provide a stop for shaft 6 and to limit axial movement to the right of shaft 6. It will be noted however, that clearance between retaining ring 13 and shoulder 9 on shaft 6 allows limited axial movement of the shaft 6 to the left. This permits testing of the effectiveness of the coupling. When assembled, there is clearance between the end of shaft 6 and reservoir 4 to permit flow of the lubricant from the reservoir to the splines as illustrated by the arrows in the FIG. 3. Reservoir 4 is filled with a lubricant 15 such as the Unitemp 500 grease described previously. As reservoir 14 is mounted so that its axis of rotation is coaxial with the axes of rotation of the shafts, it will continually replenish the lubricant at the face of the splines by centrifugal force.

The novel coupling with the self-contained lubricating system is assembled in the following manner. The reservoir is filled with the grease lubricant in the worked state. The lubricant is converted from the unworked to the worked state by beating or whipping the Unitemp 500 until it changes state, and the penetration measurement of the grease (as defined in A.S.T.M. Procedure D217–60) goes from 258 in the unworked state to 400+ in the worked state. The splines on shaft 6 are coated with a mixture of solid lubricant such as molybdenum disulfide and a grease such as Unitemp 500, a mixture which is sold by the Dow-Corning Co. under the trade name Molykote 306X. Retaining ring 13 is snapped over the reduced diameter portion of shaft 6 which lies between shoulder 9 and channel 8. Stub shaft 6 is placed within the hollow outer shaft and pushed downward until the splined portions of the two shafts engage. Shaft 6 acts like a piston compressing the air in chamber 2 causing O-ring 12 to seal the chamber formed by the two shafts. Compression of the air produces a positive gauge pressure inside the coupling, the magnitude of which is determined by the size and volume of the countersunk portions 10. Retaining ring 13 extends for only 270° or so and may therefore be compressed. Its outer diameter is slightly larger than the inner diameter of chamber 2 of shaft 1. After shaft 6 has been inserted in shaft 1, retaining ring 13 expands and is forced against the inner chamber wall and held there in a friction fit. If necessary, the end of the ring may be slightly chamfered to aid assembly of the device.

Upon rotation of the inner and outer shafts at high speeds, centrifugal force acts on the lubricant in the reservoir and tends to centrifuge the oil in the grease outwardly as illustrated by the arrows and onto the mating spline surfaces which are covered by a mixture of a solid lubricant and a grease. Therefore, the oil content of the solid lubricant-grease mixture on the surface of the spline is constantly replenished by the centrifuged oil from the grease reservoir. Since by the O-ring 12 seals the coupling very little of the oil escapes, thereby assuring a long, trouble-free life for the coupling. Furthermore, such oil as may escape or may be deposited on surfaces other than those of the splines, or actually used up, is continually replenished from the oil reservoir by centrifugal forces, thereby maintaining the proper mix of oil lubricant and solid lubricant at the surfaces of the heavily loaded splines.

It has been found that there is no need to replenish the solid lubricant placed on the splines. The density of the molybdenum disulfide is such that it remains at the spline surfaces. Only the grease must be replenished. Therefore, only grease and not solid lubricant is placed in the reservoir.

By leaving a slight clearance between the end of shaft 1 and shoulder 15 on shaft 6, the coupling may be easily tested in the field to determine whether the system is tightly sealed and whether the integrity of the lubricating system has been maintained. To determine these characteristics shaft 6 is pushed to the left until shoulder 9 butts against retaining ring 13. Shaft 6 is then released. If the coupling has maintained its integrity, the compressed air within the coupling will force shaft 6 back towards the right and return it to its original position. This indicates that the O-ring 12 is providing an adequate seal which in turn is a good indication that the lubricant is being retained within the coupling. If however, shaft 6 does not return to its original position, it is a clear indication that O-ring 12 is not seated properly and that the air pressure and most likely much of the lubricant has leaked out of the coupling. In that eventuality, the coupling may be disassembled, the O-ring replaced and the lubricant replenished. In other words, a means is provided which permits the testing of the coupling and the self-contained lubricating system in a simple and effective way without requiring disassembly of the entire coupling.

While a particular embodiment of the invention has been shown and described, it will, or course, be understood that the invention is not limited thereto since modifications may be made in the instrumentalities employed, and it is contemplated in the appended claims to cover any such modifications as for within the true spirit and scope of the invention.

What is claimed as new and desired to be secured by Letters Patent of the U.S. is:

I claim:

1. In a high speed, self lubricated drive shaft coupling, the combination comprising:
   a. a driving shaft member,
   b. a driven shaft member,
   c. mating splined portions on said driving and driven shaft members adapted to engage and form said coupling, one of said shafts being internally splined and the other externally splined,
   d. lubricant means on the mating surfaces of the splined portions,
   e. lubricant reservoir means mounted on and coaxially with one of said shaft members containing a solid but low viscosity lubricant which flow under the influence of centrifugal forces for supplying additional lubricant to said splined portions, said lubricant from said reservoir being distributed to said splined portions by centrifugal forces acting on said lubricant during rotation of said shaft members to replenish the lubricant on the splined portions,
   f. an O-ring positioned between said externally and internally splined shaft members to form a sealed coupling having a positive gauge pressure maintained therein to permit testing of said coupling without disassembly thereof by utilizing relative movement between the shafts and reaction thereto because of the positive gauge pressure to determine whether the lubricant system remains leak proof,
   g. means defining an opening in said externally splined shaft member and facing said reservoir means to control the volume in the sealed coupling and thereby the compression of the air by relative movement of said shafts to maintain thereby the desired positive gauge pressure for testing the lubricant system.